Sept. 15, 1959     H. L. ST. LAURENT     2,903,958
TRANSPORT MECHANISM
Filed Jan. 2, 1958     2 Sheets-Sheet 1
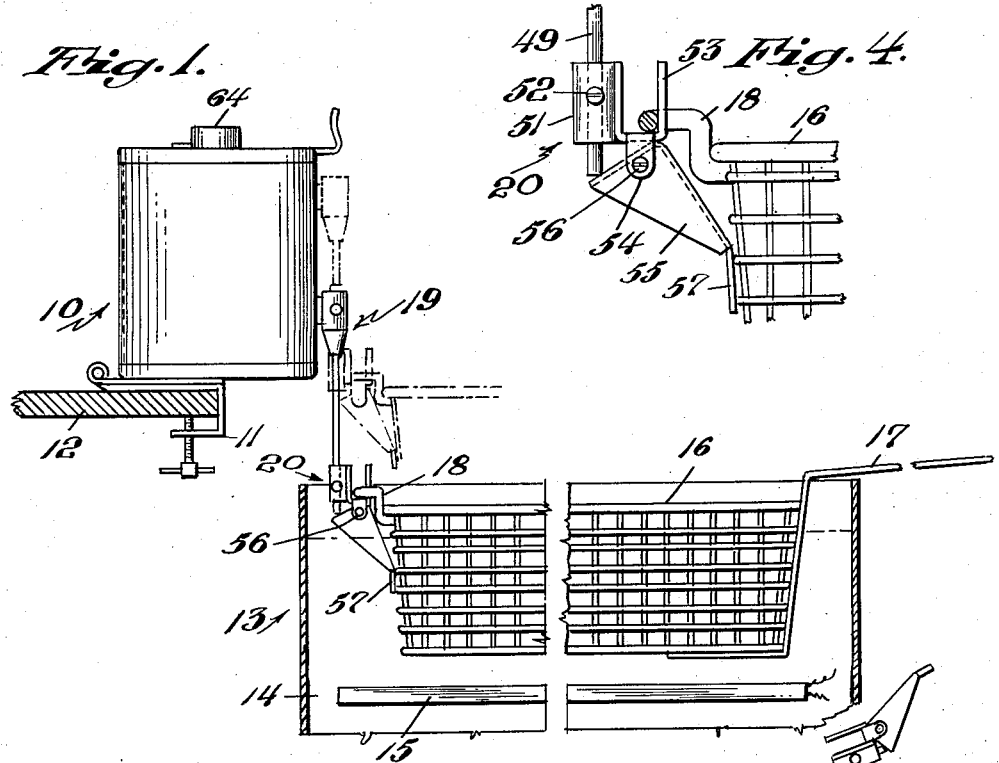
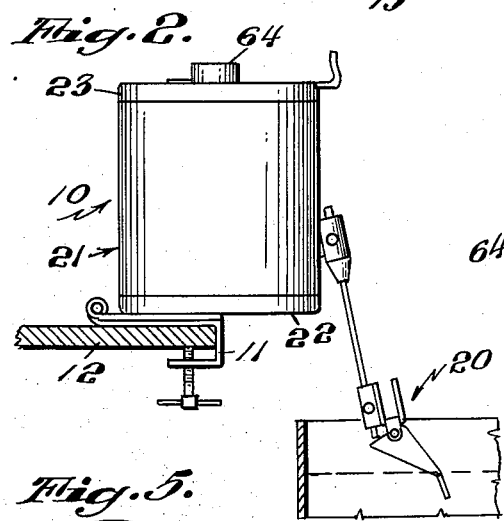
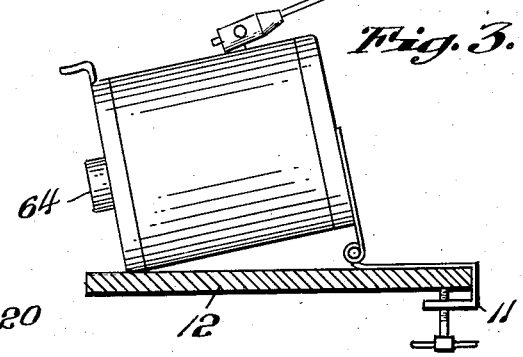
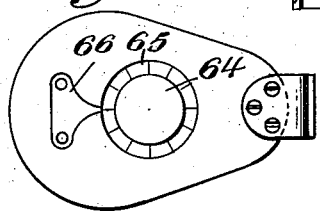
INVENTOR.
Herbert L. St. Laurent
BY
Barlow & Barlow
ATTORNEYS.

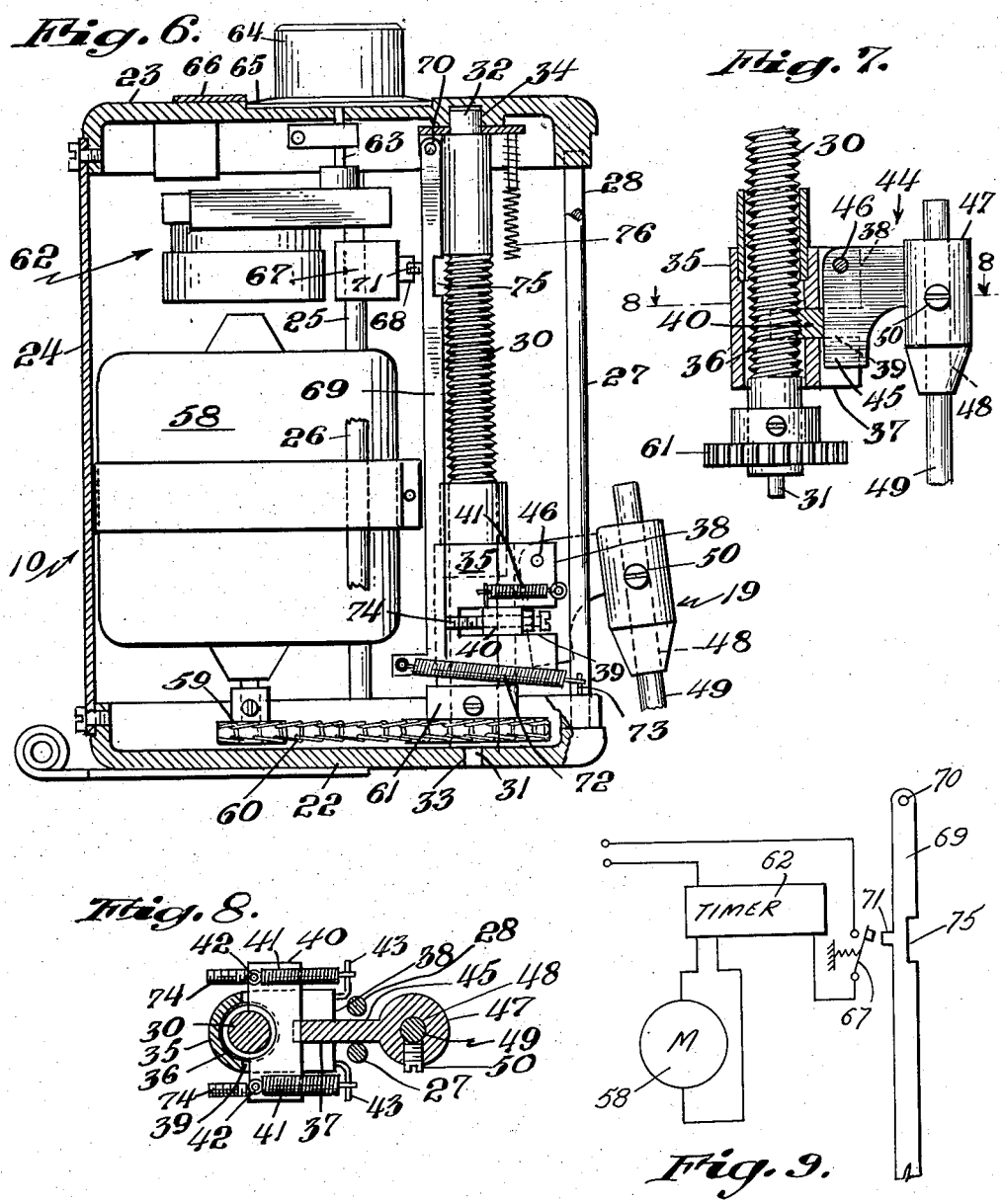

United States Patent Office 2,903,958
Patented Sept. 15, 1959

2,903,958

TRANSPORT MECHANISM

Herbert L. St. Laurent, Lakewood, R.I.

Application January 2, 1958, Serial No. 706,761

5 Claims. (Cl. 99—336)

The present invention relates to an apparatus for lifting work from one elevation to another, more particularly for lifting a receptacle containing the work during some operation performed thereon. The invention has particular utility as a means for lifting a food basket out of a deep fryer or the like and will be considered in connection therewith as a matter of convenience in describing the same.

In processing or cooking food in a so-called deep fryer, the food is usually placed in a wire basket and submerged in the cooking liquid or fat. It is desirable to remove the food from the liquid at the end of the cooking period so as to avoid overcooking and additionally to maintain uniformity in the various batches cooked. This is particularly desirable in processing so-called french fries, fish and like foods, which are first partially cooked and then set aside to be finished by frying. Upon demand the partially cooked food is taken from its receptacle in the amount required. It is also usual in many restaurants for the person operating the deep fryer to perform other chores while the cooking process is going on and it becomes a difficult task to process each batch uniformly. Means have been proposed for indicating the end of the cooking period. These, however, for various reasons have not proven completely satisfactory and often have been of a nature not suitable of use in the smaller restaurant.

In general, the present invention contemplates an apparatus which includes a lifting means which will be placed in operative relation upon being engaged by the food basket; a suitable power source for operating the lifting means; and a timer mechanism for controlling the power source.

An object of the invention is to provide an apparatus of the above character which will be particularly adapted for use in connection with a deep fryer.

Another object of the invention is to provide an apparatus of the above character in which the lifting means will be returned to initial position by gravity action.

Another object of the invention is to provide an apparatus of the above character in which the lifting means is sensitive to material being placed thereon so as to actuate the timer mechanism.

A more specific object of the invention is to provide in an apparatus of the above character, a lifting means including a lead screw and a traveler member placed in operation with the lead screw upon suspending the food basket therefrom.

With these and other objects in view, the invention consists of certain novel features of construction as will be more fully described and particularly pointed out in the appended claims.

In the accompanying drawings:

Figure 1 is a side elevational view partially in section showing my improved work lifting apparatus in connection with a food cooking apparatus;

Figure 2 is a similar view of the work lifting unit of Figure 1 free of the work;

Figure 3 is a similar view with the unit shown in a different relation;

Figure 4 is an elevational view of the hook portion of the unit;

Figure 5 is a top plan view of the unit;

Figure 6 is an elevational view of the interior of the unit with the casing therefore broken away and shown in section;

Figure 7 is a section view of a fragmentary portion of the work holder of the unit;

Figure 8 is a sectional view taken substantially along line 8—8 of Figure 7; and Figure 9 is a wiring diagram used in the apparatus.

Referring to the drawings in more detail, 10 designates generally a lifting apparatus or elevator having a casing in which are enclosed the working parts. The apparatus is preferably provided with a separable hinged bracket 11 for attaching the unit in a suitable manner to some convenient support 12 which may be part of the work processing apparatus with which the unit is to be associated. In the present instance the work processing apparatus comprises a deep fryer, indicated generally 13, which has a compartment or chamber 14 in which are located conventional heating units shown as at 15. It is conventional in cooking or processing food in a deep fryer, to place the food in a wire basket such as 16 having a handle 17 at one end thereof and a hook 18 at the other end which is used for engaging an edge of the deep fryer or other support for holding the basket above the liquid in the vessel ready to be inserted into the vessel or to allow dripping of excess cooking liquid from the cooked food. The unit 10, in the present instance, is provided with a work holder designated generally 19 having a hook portion 20 which is engaged by the basket hook 18 to suspend the basket in the cooking liquid or above the same as the case may be. The hook 20 in the rest position is shown in full lines in the drawing and is located (see Figure 2) in a position in the vessel to be engaged by the hook 18 when the basket is lowered into the cooking liquid. Upon the hook 20 being engaged by the basket, the weight of the basket plus the weight of the food will rock the holder 19, as will be hereinafter described, to set the apparatus or unit 10 into operation so that the basket will be lifted from the cooking liquid after a predetermined period has elapsed and hold the basket in the raised position above the liquid. The timing mechanism of the apparatus will then automatically reset itself for a next cycle of operation and upon removal of the basket, the holder 19 will return to the initial position.

The unit 10 (see Figure 6) comprises a casing 21 having opposite heads 22 and 23 which are secured to each other in spaced relation by posts 24, 25, 26, 27 and 28. A screw threaded shaft 30 is provided with reduced end trunnions 31 and 32 which are journaled in bearing openings 33 and 34 in the heads 22 and 23 respectively. The work holder 19 (see Figure 7) comprises a generally rectangular block or traveler 35 provided with a bore 36 which has a sliding relation with the shaft 30. A slot 37 extends inwardly from the outer edge 38 of the block from one end thereof to the other end thereof and is intersected by a second slot 39 which extends inwardly from said edge 38 to a point beyond the axis of said bore 36. A half nut 40 (see Figure 7) is loosely received within the slot 39 and is adapted to be moved into engagement with the shaft 30 but is normally held away from shaft 30 by means of pull springs 41 which are secured to said half nut as at 42 and to pins or the like 43 which project outwardly from the edge 38. Thus, it will be seen the nut 40 provides a coupling for connecting the traveler 35 to shaft 30 for axial movement of the traveler upwardly along the shaft 30 when rotated. A bell crank like lever 44 which has an arm 45 extending into slot 38, is rockably mounted on the traveler as at 46. The arm 45 on one side of the pivot 46 extends into engagement with the half nut 40 and extends on the other side of the said pivot outwardly between the posts 27, 28 which form a guide and holds the traveler against rotation relative to the shaft 30. The outer end of the arm 45 terminates in an enlarged cylinder 47 having a bore extending therethrough in which is received a rod 49, adjustably secured to said cylinder by a screw 50.

The hook portion 20 of the work holder is carried at the lower end of rod 49 by means of a cylindrical body 51 (see Figure 4) having a bore for receiving the rod 49 that is adjustably secured thereto by screw 52. A U-shaped member 53 has one arm thereof attached to said body and is provided with a pair of depending ears 54 between which is received a basket leveling member 55 pivoted to said ears as at 56. Member 55 has a lip 57 (see Figures 1 and 4) which extends to engage the adjacent side of the basket when the hook 18 thereof is positioned to engage in the U-member or hook 53. It will be apparent that the basket loaded with food will tend to rotate member 55 about pivot 56 which will be blocked by the engagement of the member 55 against the ends of rod 49. The hook, however, is adjustably secured to rod 49 and may be adjusted so as to allow the rod 49 to project beyond the body 51 the required distance thereby adjusting the position of the lip 57 to hold the basket level. It will also be apparent that the hook 18 under load of the basket will have a tendency to ride forward on the bight of the U-member 53 to engage the outer arm of the member 53. Accordingly, upon hooking the basket on the U-member 53, the weight of the basket and food therein will rock lever 44 in a clockwise direction, as seen in Figure 6, so as to move the half nut 40 against the spring bias and into engagement with shaft 30 thereby coupling the traveler to the shaft 30. It may be here mentioned that upon the nut 40 being free of the shaft 30, the traveler is free to slide along shaft 30.

From the above it will be apparent that the traveler 35 coupled to the shaft 30 will be moved upwardly therealong when the shaft is rotated. When the traveler is free of the basket, the spring 41 will withdraw the half nut from engagement with shaft 30 and the traveler through gravity action will slide down the shaft to initial position, the fall being checked in a manner which will hereinafter appear.

The shaft 30 is rotated by a motor 58 having a sprocket wheel 59 secured to the shaft thereof and connected by a sprocket chain 60 to a sprocket wheel 61 secured to the lower end of shaft 30. The motor 58 is normally inactive and is activated through a time mechanism or device indicated generally 62 which may be of any suitable manufacture capable of a predetermined delayed switching action after being initially set into operation, to close the motor circuit (not shown), and which may be conventional. Such timing devices are usually provided with a shaft 63 manually turned by a knob 64 (see Figure 5) to adjust the mechanism for the predetermined delayed action, a dial 65 and pointer 66 being provided for predetermining the setting of the mechanism. A normally open micro-switch 67 having the usual flexible operating finger 68 is operatively connected in the circuit of the timing device 67 and is moved to the closed and open position by a depending arm 69 which is pivoted by the rocking action of work holder 19.

The arm 69 is pivoted at the upper end thereof as at 70 and carries an adjustable projection 71 which extends into engagement with finger 68. One end of a pull spring 72 is attached to the lower end of arm 69 and the other end of the spring is secured to a pin 73 fixed on the head 22 so as to resiliently bias the arm 69 into engagement against threaded members or screws 74 which are carried by the nut 40. Thus when the nut 40 is engaged with the shaft 30, the arm 69 will be moved towards switch 67, the projection 71 engaging finger 68 and closing the switch 67. When the nut 40 is moved out of engagement with the shaft 30, the spring bias on said arm will move the same in the other direction to move the projection 71 away from finger 68 to allow the switch 67 to return to the open relation in the known way.

From the above it will be apparent with rod 49 in its lower position that upon loading of the hook 53 with a basket 16, the bell crank arm 44 will be rocked moving nut 40 into engagement with the shaft 30 the member 74 swinging the arm toward the left as seen in Figure 6. This movement will actuate switch 67 which closes the circuit of the timer 62 and sets the same into operation. Upon the elapse of a predetermined time period, the timer mechanism will close the circuit to the motor, and the motor will be energized to rotate shaft 30. This will cause the traveler or carrier 35 to move upwardly along shaft 30 in the known manner and raise the basket out of the vessel 13. During the upward movement of the traveler 35, the threaded member 74 remains in engagement with arm 69 and the switch 67 will be maintained in the closed relation. At near the end of the upward travel of traveler 35, the screws 74 will ride into a recess or notch 75 in arm 69 and this will allow arm 69 under urge of spring 72 to move in a direction to free the finger 68 from projection 71 and allow the micro-switch 67 to return to open position thereby opening the circuit to the timer and the motor. Upon removal of the basket 16 from the hook 53, the nut 40 under urge of springs 41, 72 will move out of engagement with shaft 30. The traveler being free of shaft 30, will slide down the shaft to initial position, the friction of the arm 69 on the ends of screws 74 applying a yielding check on the fall of the traveler. The fall of the traveler 35 is through gravity and in order to apply an initial inertia overcoming force, a compression spring 76 (see Figure 6) is arranged to depend from the head 23 in the path of movement of traveler 35, as seen in Figure 6. During the upward movement of the traveler 35, the same will engage and compress the spring 76 which upon the traveler 35 being free of the shaft 30 will exert a downward force on the traveler to initially push the same.

It may now be apparent that I have disclosed a time controlled apparatus which is operable to raise work from one level to another after a predetermined period has elapsed from the initial setting of the apparatus into operation. It will be further apparent that while the invention has been shown and described in connection with a deep fryer, the apparatus has application other than raising a deep fryer basket out of the fryer vessel.

I claim:

1. An apparatus for transporting work from one location to another location, comprising a rotatable screw threaded shaft, a motor for rotating said shaft, timing means for controlling the operation of said motor, said timing means including a normally open switch, a traveler mounted for reciprocation axially of said shaft and held against rotation relative thereto, coupling means carried by said traveler for screw-threaded engagement with said shaft for movement of said traveler axially along said shaft, a work holder rockably mounted on said traveler for holding work suspended from said traveler, said holder being rocked by said work to be moved into engagement with said coupling means for moving the same into engagement with said shaft, and means co-operating with said coupling means for moving said switch to closed position for actuating said timing means.

2. An apparatus as in claim 1 wherein resilient means bias said coupling means out of engagement with said shaft.

3. An apparatus as in claim 1 wherein a spring biases said coupling out of engagement with said shaft and a basket of a weight to overcome the action of said spring engages said work holder.

4. In a food processing apparatus having a liquid containing vessel for receiving a basket for holding food to be processed, a generally vertical rotatable screw threaded shaft, a traveler for reciprocation axially of said shaft and held against rotation relative to said shaft, a nut rockably mounted on said traveler for a coupling screw threaded engagement with said shaft, a basket, a holder for said basket rockably mounted on said traveler and depending therefrom, said holder being rocked by engagement with said nut and moving the same into coupled engagement with said shaft when said basket is supported by said holder.

5. In a food processing apparatus as in claim 4 wherein a spring urges said nut out of engagement with said shaft when the weight of the basket is removed from said holder.

References Cited in the file of this patent
UNITED STATES PATENTS

| | | |
|---|---|---|
| 349,343 | Ernst | Sept. 21, 1886 |
| 1,135,868 | Vinyard | Apr. 13, 1915 |
| 1,478,939 | Cavilla | Dec. 25, 1923 |
| 1,482,390 | Eden | Feb. 5, 1924 |
| 1,551,869 | Deaving | Sept. 1, 1925 |
| 2,662,465 | Beer | Dec. 15, 1953 |
| 2,756,623 | Farrow | July 31, 1956 |